(12) United States Patent
Lyons et al.

(10) Patent No.: US 7,753,977 B2
(45) Date of Patent: Jul. 13, 2010

(54) AIR FILTRATION SYSTEM HAVING A REMOVABLE DIFFUSER

(75) Inventors: Edward F. Lyons, Riverside, IL (US); Wenli Wang, Woodridge, IL (US); Philip J. Winters, Lockport, IL (US)

(73) Assignee: Filtration Group, Inc., Joliet, IL (US)

( * ) Notice: Subject to any disclaimer, the term of this patent is extended or adjusted under 35 U.S.C. 154(b) by 775 days.

(21) Appl. No.: 11/149,019

(22) Filed: Jun. 9, 2005

(65) Prior Publication Data

US 2006/0277873 A1    Dec. 14, 2006

(51) Int. Cl.
 *B01D 46/00* (2006.01)
(52) U.S. Cl. ............... 55/385.1; 55/385.2; 55/410; 55/467; 55/471; 55/DIG. 29
(58) Field of Classification Search ............... 55/416, 55/410, 413, 467, 471, 385.1, 385.2, DIG. 29
See application file for complete search history.

(56) References Cited

U.S. PATENT DOCUMENTS

| | | |
|---|---|---|
| 2,695,413 A | 11/1954 | Ter Matt |
| 3,107,863 A | 10/1963 | Potapenko |
| 3,151,929 A | 10/1964 | Potapenko |
| 3,239,305 A | 3/1966 | Potapenko |
| 3,280,542 A * | 10/1966 | Heijnis ............... 55/485 |
| 3,385,036 A | 5/1968 | Webb |
| 3,462,920 A | 8/1969 | Denny |
| 3,511,162 A | 5/1970 | Truhan |
| 3,709,210 A | 1/1973 | Matthews |
| 3,719,136 A | 3/1973 | Criddle |
| 3,724,172 A | 4/1973 | Wood |
| 3,780,503 A | 12/1973 | Smith |
| 3,820,536 A | 6/1974 | Anspach, Jr. et al. |
| 3,838,556 A | 10/1974 | Finger |
| 3,923,482 A | 12/1975 | Knab et al. |
| 3,935,803 A | 2/1976 | Bush |
| 3,998,142 A | 12/1976 | Foreman et al. |
| 4,023,472 A | 5/1977 | Grunder et al. |
| 4,045,192 A * | 8/1977 | Eckstein et al. ............... 96/224 |
| 4,175,936 A | 11/1979 | Lough et al. |
| 4,427,427 A | 1/1984 | DeVecchi |
| 4,603,618 A * | 8/1986 | Soltis ............... 454/187 |
| 4,629,482 A | 12/1986 | Davis |
| 4,817,508 A | 4/1989 | Prochnow |
| 4,883,511 A | 11/1989 | Gusin et al. |
| 4,909,815 A * | 3/1990 | Meyer ............... 96/131 |
| 5,071,555 A | 12/1991 | Enbom |
| 5,129,928 A | 7/1992 | Chan et al. |
| 5,167,681 A | 12/1992 | O'Keefe et al. |
| 5,192,348 A | 3/1993 | Ludwig |
| 5,203,489 A | 4/1993 | Gileta et al. |

(Continued)

*Primary Examiner*—Duane Smith
*Assistant Examiner*—Ives Wu
(74) *Attorney, Agent, or Firm*—Merchant & Gould P.C.

(57) ABSTRACT

An air filtration system includes a support structure, an enclosure coupled to the support structure and including an air outlet, a filter and a fan operatively coupled to the enclosure, and a diffusion screen configured to cover the air outlet. The diffusion screen includes a screen frame configured to be removably attachable to the enclosure with at least one releasable fastener, and at least a diffusion layer substantially spanning the screen frame to cover the air outlet to provide unidirectional or laminar air flow from the air outlet.

4 Claims, 13 Drawing Sheets

U.S. PATENT DOCUMENTS

| | | |
|---|---|---|
| 5,209,402 A | 5/1993 | DeBra et al. |
| 5,236,480 A | 8/1993 | Svensson et al. |
| 5,389,037 A | 2/1995 | Hale |
| 5,395,429 A | 3/1995 | Sutsko et al. |
| 5,454,756 A | 10/1995 | Ludwig |
| 5,487,766 A | 1/1996 | Vannier |
| 5,529,092 A | 6/1996 | Arnoldt |
| 5,725,427 A | 3/1998 | Koerber |
| 5,782,689 A * | 7/1998 | Woolsey et al. ............ 454/296 |
| 5,899,001 A | 5/1999 | Layton |
| 6,021,252 A | 2/2000 | Faris et al. |
| 6,059,655 A | 5/2000 | Koerber |
| 6,110,244 A * | 8/2000 | Wood ....................... 55/385.2 |
| 6,119,689 A | 9/2000 | Korman |
| 6,139,426 A | 10/2000 | Koerber |
| 6,425,821 B1 | 7/2002 | Koerber et al. |
| 6,508,850 B1 | 1/2003 | Kotliar |
| 6,557,583 B2 | 5/2003 | McCabe |
| RE38,406 E | 1/2004 | Faris et al. |
| 6,699,348 B2 | 3/2004 | Hugert et al. |
| 6,770,108 B2 | 8/2004 | Cherry, Sr. |
| 6,811,593 B2 | 11/2004 | Hansson et al. |
| 2003/0150328 A1 * | 8/2003 | Hansson et al. ............... 95/273 |
| 2003/0192822 A1 | 10/2003 | Cherry, Sr. |
| 2004/0009746 A1 | 1/2004 | Korman |
| 2004/0192186 A1 | 9/2004 | Bourgeois et al. |
| 2005/0281999 A1 * | 12/2005 | Hofmann et al. ......... 428/304.4 |

* cited by examiner

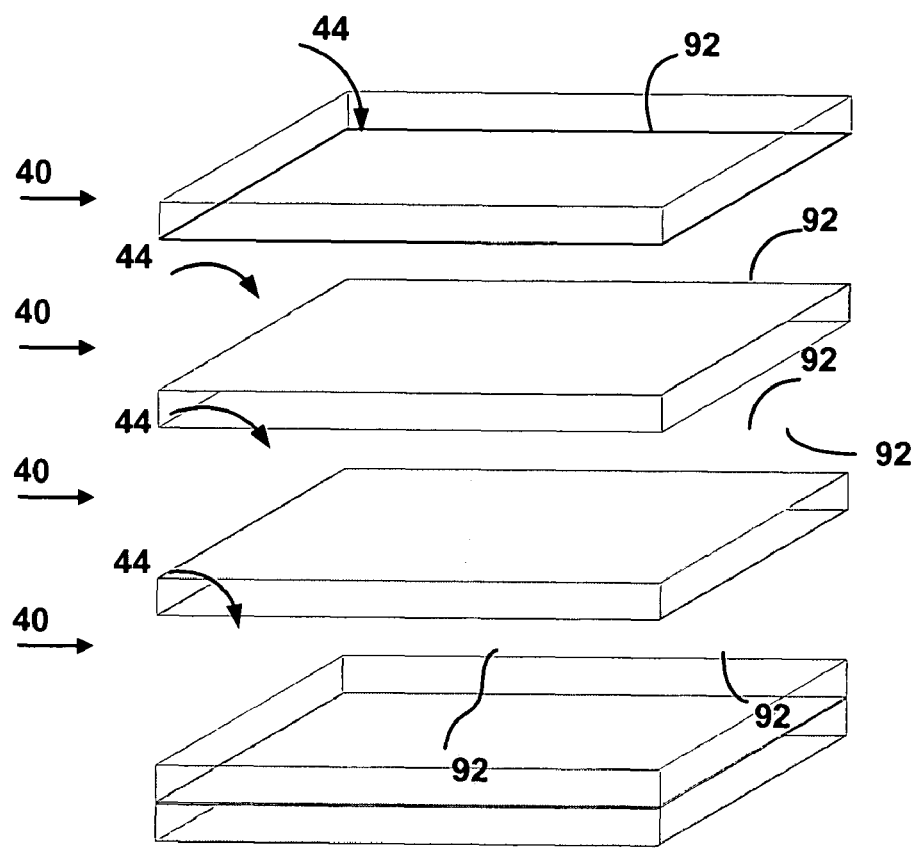

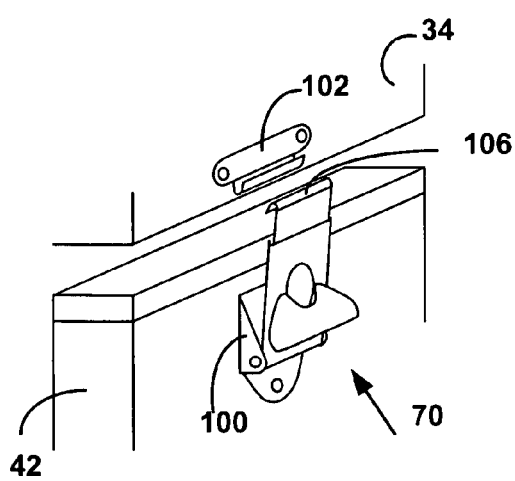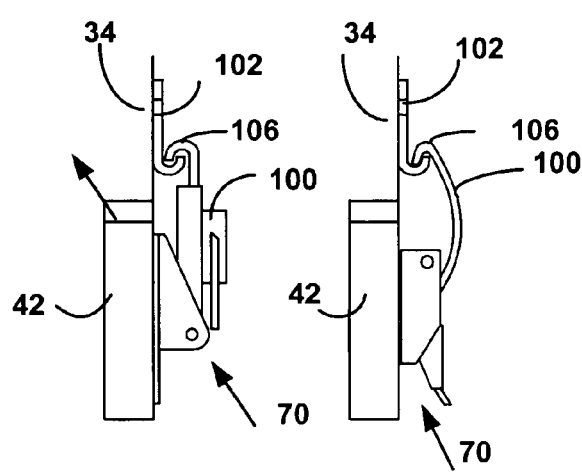
FIG. 12  FIG. 13(A)  FIG. 13(B)

AIR FILTRATION SYSTEM HAVING A REMOVABLE DIFFUSER

FIELD OF THE DISCLOSURE

The present application generally relates to air filtration systems, and more particularly, to an air filtration system having a removable diffuser.

BACKGROUND

Air filtration devices are typically used in environments where clean air having low particulate matter or low gaseous contaminate material is required. For example, air filtration systems are used in operating rooms of hospitals, in hospital rooms where burn patients are treated, in clean rooms such as semiconductor manufacturing facilities, and in any other environment where small particles, certain gaseous materials, or certain contaminants in the surrounding air can be hazardous to a person's health or disrupt the work being performed or damage the products.

Air filtration systems typically include a fan unit that receives air from an air input and directs the air with a desired flow rate to a filter unit. The filter unit removes the particulate matter and/or gaseous contaminant material from the air. Air filtration systems may also include a diffuser positioned downstream of the filter that can change flow characteristics of the air. A diffuser can be designed to provide unidirectional flow, multidirectional flow, laminar flow, or turbulent flow.

Many air filtration systems are of room air cleaner type. They are designed to clean air in an entire room or space and can not direct air to a small desired area. The air flow coming out of a typical room air cleaner is turbulent. Such units cannot provide unidirectional air flow to a specific zone to create a localized clean environment.

Many other air filtration systems are ceiling mounted or attached to a work surface. Accordingly, the clean air is directed to a desirable location depending on the fixed position and orientation of the air filtration system. For example, a ceiling mounted air filtration system will typically direct the air flow downward. In another example, a work bench can include an air filtration system mounted above the work surface thereof so that clean air is directed onto the work surface. Such air filtration systems are not portable and can only be used in the environment and for the application for which they are designed. Furthermore, most of such air filtration systems do not have diffusers for providing laminar or unidirectional clean air flow to a localized zone without containment of the airflow. For those systems that have diffusers, the diffuser can not be easily removed and replaced with another diffuser. Such removal may be necessary for replacing or cleaning the diffuser, or replacing the filter, or modifying the flow characteristics.

Therefore, there exists a need in the art for an air filtration system with a removable diffuser that is portable, can be reoriented to provide unidirectional clean air to a desired zone, and has a diffuser material that can be easily replaced or cleaned.

BRIEF DESCRIPTION OF THE DRAWINGS

Certain embodiments are shown in the drawings. However, it is understood that the present disclosure is not limited to the arrangements and instrumentality shown in the attached drawings, wherein:

FIG. 12 illustrate a perspective view of a latching mechanism for removably attaching a diffusion screen to an enclosure in accordance with the teachings of the present disclosure;

FIGS. 13(A) and 13(B) illustrate side views of two exemplary configurations for the latching mechanism of FIG. 12.

DETAILED DESCRIPTION

Figure 1:
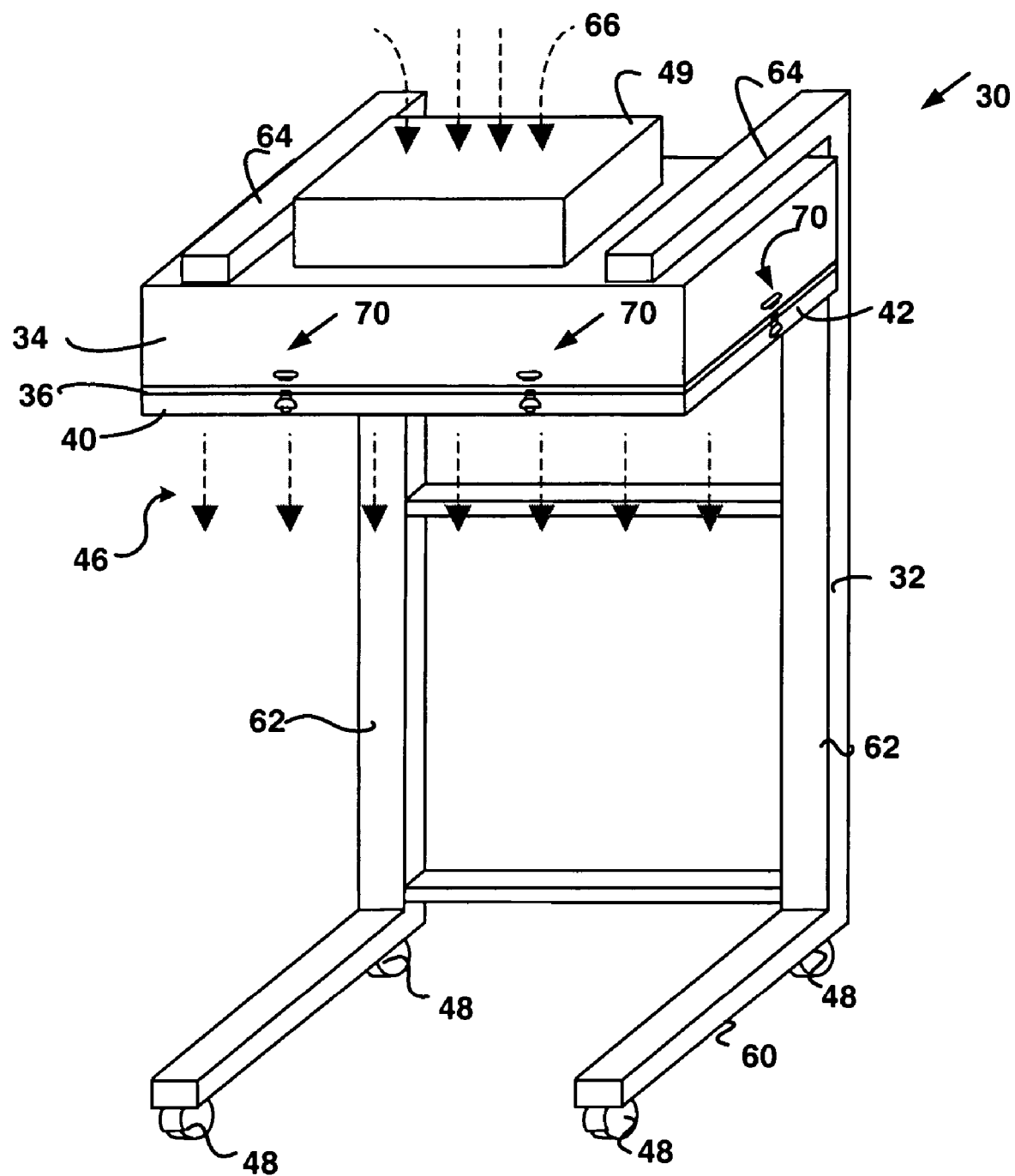
FIG. 1 illustrates a perspective view of an air filtration system constructed in accordance with the teachings of the present disclosure.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

In accordance with a principal aspect of the present disclosure, an air filtration system includes a support structure, an enclosure coupled to the support structure and including an air outlet, a filter and a fan operatively coupled to the enclosure, and a diffusion screen configured to cover the air outlet. The diffusion screen includes a screen frame configured to be removably attachable to the enclosure with at least one releasable fastener, and at least a diffusion layer substantially spanning the screen frame to cover the air outlet to provide unidirectional air flow from the air outlet.

In accordance with another principal aspect of the present disclosure, a diffusion screen for an air filtration system having a filter and a fan operatively coupled to an enclosure for providing air flow from an air outlet of the enclosure includes a frame and a diffusion layer. The frame is configured to be removably attached to a perimeter of the air outlet with at least one releasable fastener. The diffusion layer spans the frame to cover the air outlet. The diffusion layer is configurable to provide at least unidirectional or laminar flow from the air outlet.

In accordance with another principal aspect of the present disclosure, an air filtration system includes a support structure, an enclosure coupled to the support structure, the enclosure including an air outlet, a filter and a fan attached to the support structure and operatively coupled to the enclosure to provide airflow from the air outlet, and a diffusion screen configured to cover the air outlet. The diffusion screen includes a frame configured to be removably attached to a perimeter of the air outlet with at least one releasable fastener, and at least a diffusion layer spanning the frame to cover the air outlet, the diffusion layer configured to provide at least unidirectional or laminar flow from the air outlet.

Referring to FIGS. 1-7, several examples of an air filtration system 30 constructed in accordance with the teachings of the present disclosure are shown. Each of the air filtration systems 30 includes a support structure 32 and an enclosure 34 that is coupled to the support structure 32. The enclosure 34 includes an air outlet 36. A filter and a fan (not shown) are operatively coupled to the enclosure 34. Each of the air filtration systems 30 also includes a diffusion screen 40 that is configured to cover their air outlet 36. The diffusion screen includes a screen frame 42 that supports at least one diffusion layer 44 substantially spanning the screen frame 42. The screen frame 42 and the diffusion layer 44 cover the air outlet 36 and provide unidirectional or laminar air flow 46 from the air outlet 36.

The filter and the fan (not shown) may be housed in the enclosure 34 such that it is adjacent to the air outlet 36. Alternatively, the filter and the fan may be disposed outside the enclosure 34 and in air flow communication with the enclosure 34. The filter and the fan (not shown) are referred to herein as a single unit. However, one of ordinary skill in the art will appreciate that the filter and the fan (not shown) can also be two independent structures that may only be in air flow communication. Accordingly, the filter and the fan (not shown) that is disclosed herein generally refers to any configuration of a filter and a fan to provide the functionality disclosed herein.

The air filtration systems 30 may be portable. Accordingly the support structure 32 may be coupled to a plurality of wheels 48 that can move the air filtration system 30 to any desired location. Alternatively, the air filtration system 30 may be fixed and not portable. For example, as shown in FIG. 6, the air filtration system 30 may be installed in a ceiling of a room such that the air outlet 36 is pointing generally downward into the room. As will be described in detail in the following, FIGS. 1-7 illustrate several exemplary configurations by which the air filtration system 30 may be designed to provide unidirectional or laminar air flow from the air outlet 36. Regardless of what type and configuration of air filtration system 30 is used, the diffusion screen 40 can be attached to the air outlet 36 of any air filtration system 30 so as to provide unidirectional or laminar flow from the air outlet 36.

Referring to FIG. 1, the air filtration system 30 includes the support structure 32 having a base 60, a pair of upright beams 62 and an upper support 64. The base 60 is supported on the ground by the plurality of wheels 48 so that the entire support structure 32 can be portable. The enclosure 34 is attached to the upper supports 64, such that the air outlet 36 is generally pointed downward to provide the air flow 46 in the downward direction. The length of the upright beams 62 may be adjustable to provide height adjustability of the support structure 32. The enclosure 34 also includes an air flow inlet 66 that provides air to the filter and the fan (not shown) that is housed in the enclosure 34. The diffusion screen 40 is attached to the enclosure 34, such that it covers the air outlet 36 and provides the unidirectional or laminar air flow 46. A pre-filter 49 (shown in FIG. 1) may also be disposed in or outside the enclosure 34 to provide pre-filtering of the air from the air flow inlet 66. Laminar flow is a state of flow where fluid at low velocities flows without lateral mixing, which is described mathematically by a Reynolds number. The adjacent layers of flow slide past one another like playing cards. Laminar flow is used in applications such as forming fog screen for image projection or designing aircraft wings. Unidirectional flow is a state of flow where fluid flows in a single direction with generally parallel streamlines, which is not constrained by specific Reynolds number ranges. Unidirectional flow is used in a number of applications such as clean rooms for electronic and pharmaceutical industries and biological safety cabinets where process or products can be protected.

The diffusion screen 40 may include a plurality of releasable fasteners 70 that can attach the diffusion screen 40 to the enclosure 34. The enclosure 34 may be fixedly attached to the upper support 64. Accordingly the direction of the air flow 46 may not be adjustable. However, as shown in FIG. 4, the enclosure 34 may be pivotable relative to the upper support 64 or the upright beams 62, such that the direction of the air flow 46 can be adjusted as desired.

Figure 4:
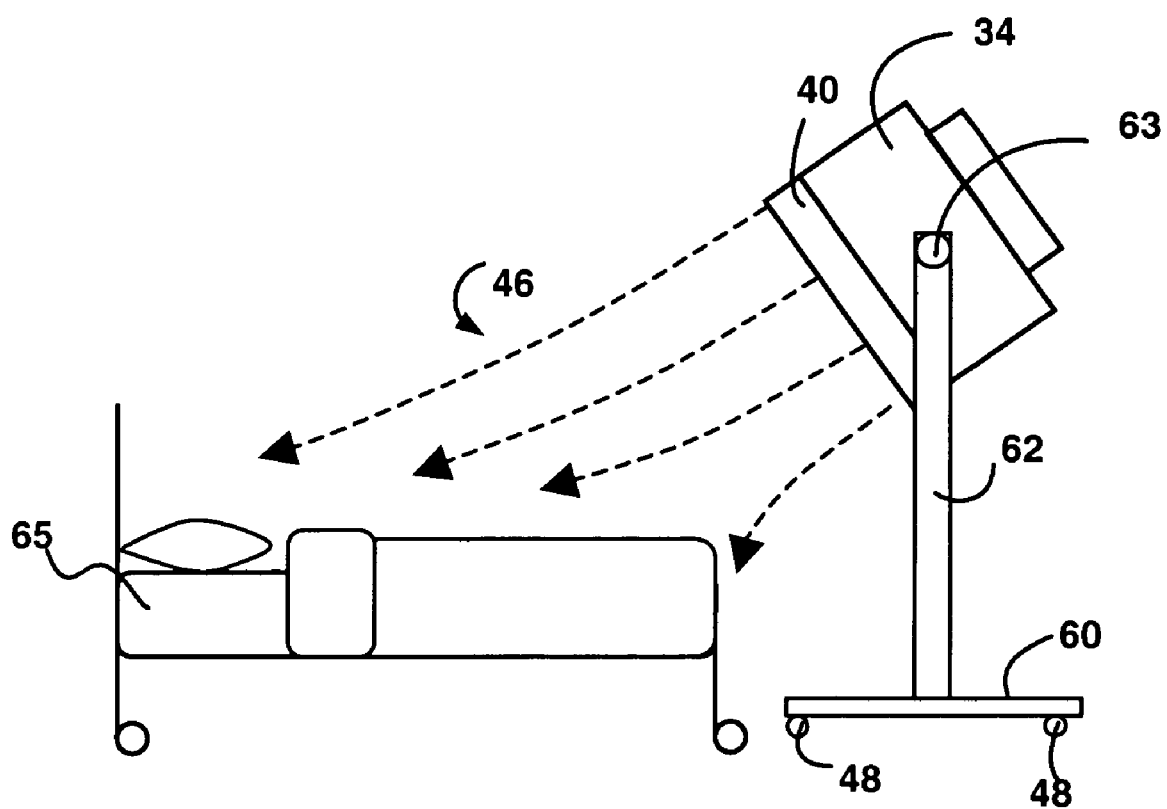
FIG. 4 illustrates a side view of another air filtration system constructed in accordance with the teachings of the present disclosure.
Figure 7:
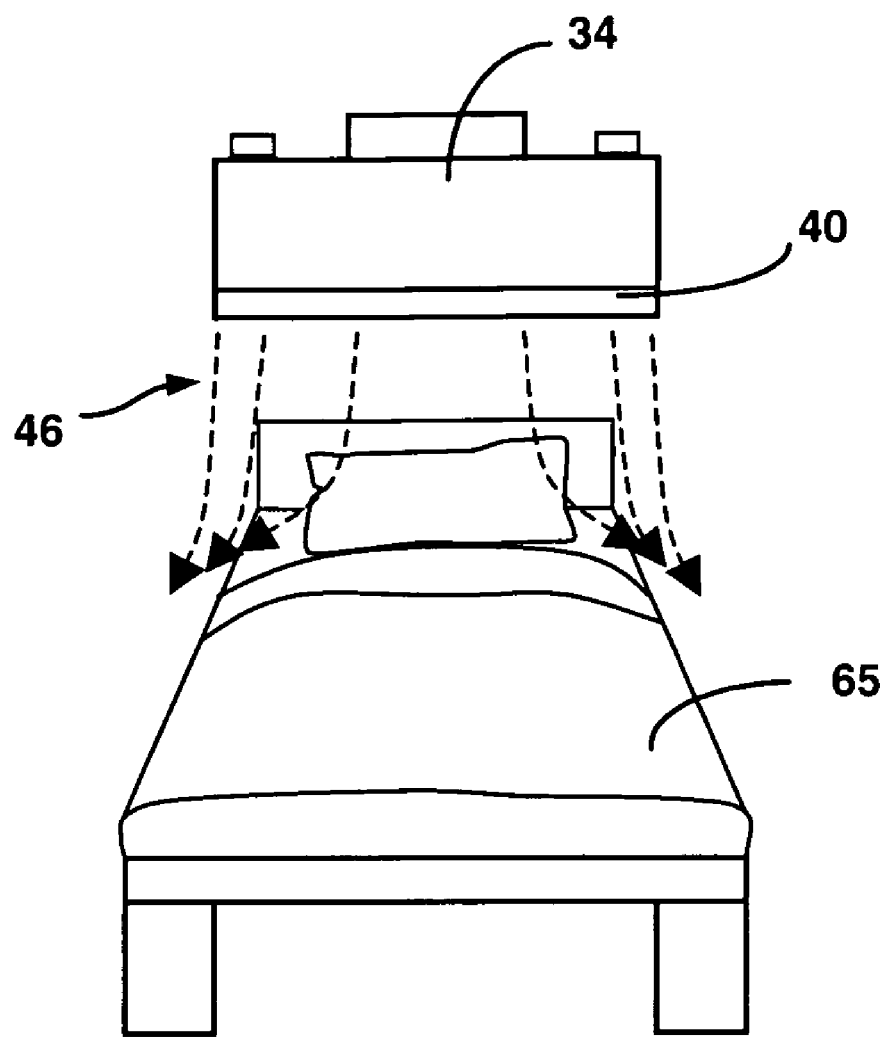
FIG. 7 illustrates a front perspective view of another air filtration system constructed in accordance with the teachings of the present disclosure.
Figure 8:
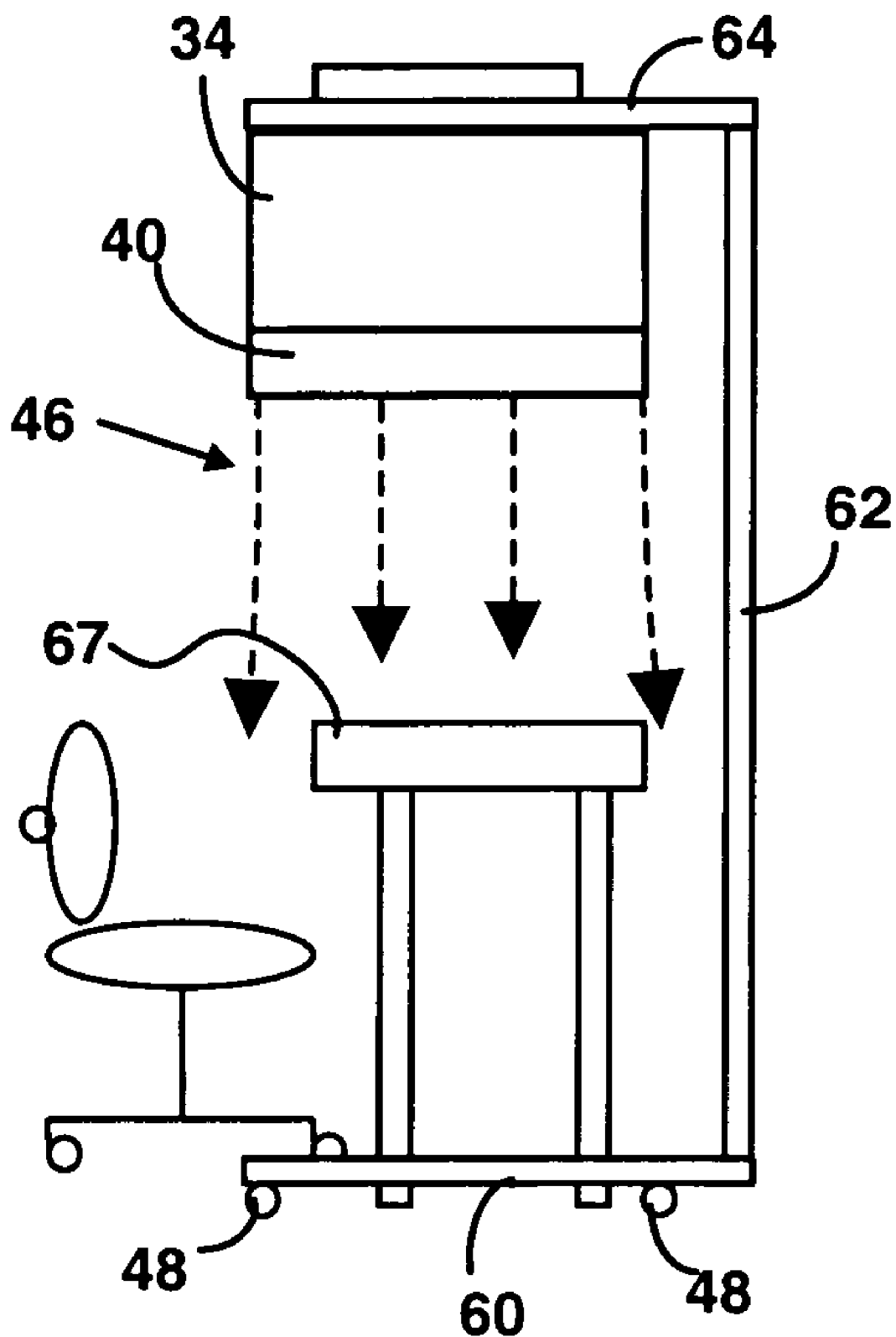
FIG. 8 illustrates a side view of another air filtration system constructed in accordance with the teachings of the present disclosure.

FIGS. 4, 7 and 8 illustrate two applications in which the air filtration system 30 of FIGS. 1, 4, 7 and 8 can be used. The air filtration system 30 can be used in medical facilities where providing unidirectional or laminar air flow over a patient is necessary to insulate the patient from the possibly unclean air in the room. Accordingly, as shown in FIGS. 4 and 7, the air filtration system 30 of FIG. 1 can be moved so that the enclosure 34 is either directly over a bed 65 in which the patient lies. Also, as shown in FIG. 4, the enclosure 34 can be pivotally mounted to the upright beams 62 at hinges 63 so as to adjust the direction of the airflow 46 without having to move the air filtration system 30. Such a portable air filtration system 30 can be easily moved throughout a medical facility.

Referring now to FIG. 8, another application in which the air filtration system of FIG. 1 can be used is shown. In certain work environments, it may be necessary to shield a work surface 67 from the air surrounding the work surface 67. Accordingly, the air filtration system 30 of FIG. 1 can be moved so that the enclosure 34 is positioned over the work surface 67 and the air flow 46 is directed generally downward onto the work surface 67. From the above examples, one of ordinary skill in the art will appreciate the numerous applications for which the disclosed air filtration system 30 may be used.

Figure 2:
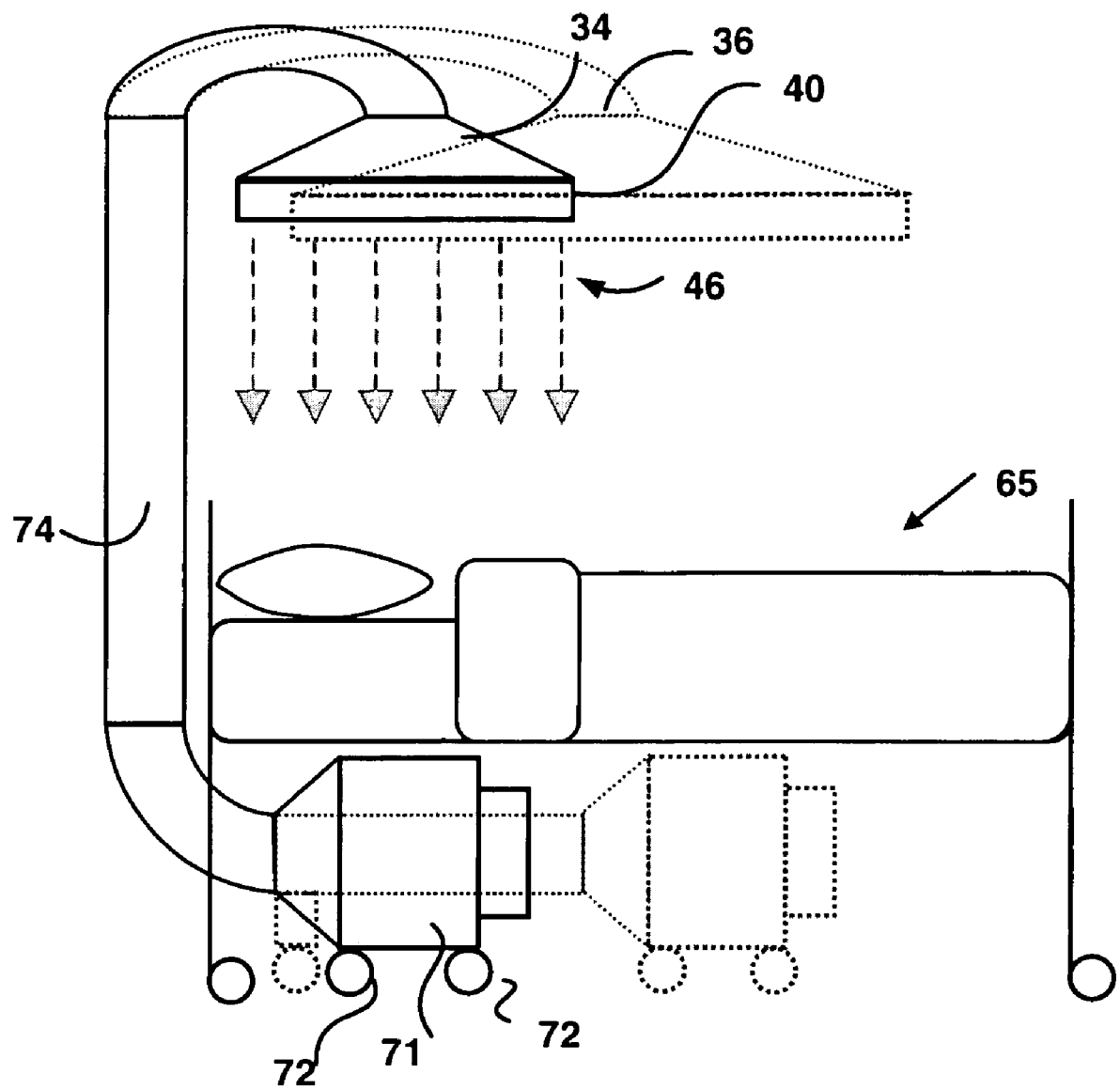
FIG. 2 illustrates a side view of another air filtration system constructed in accordance with the teachings of the present disclosure.
Figure 3:
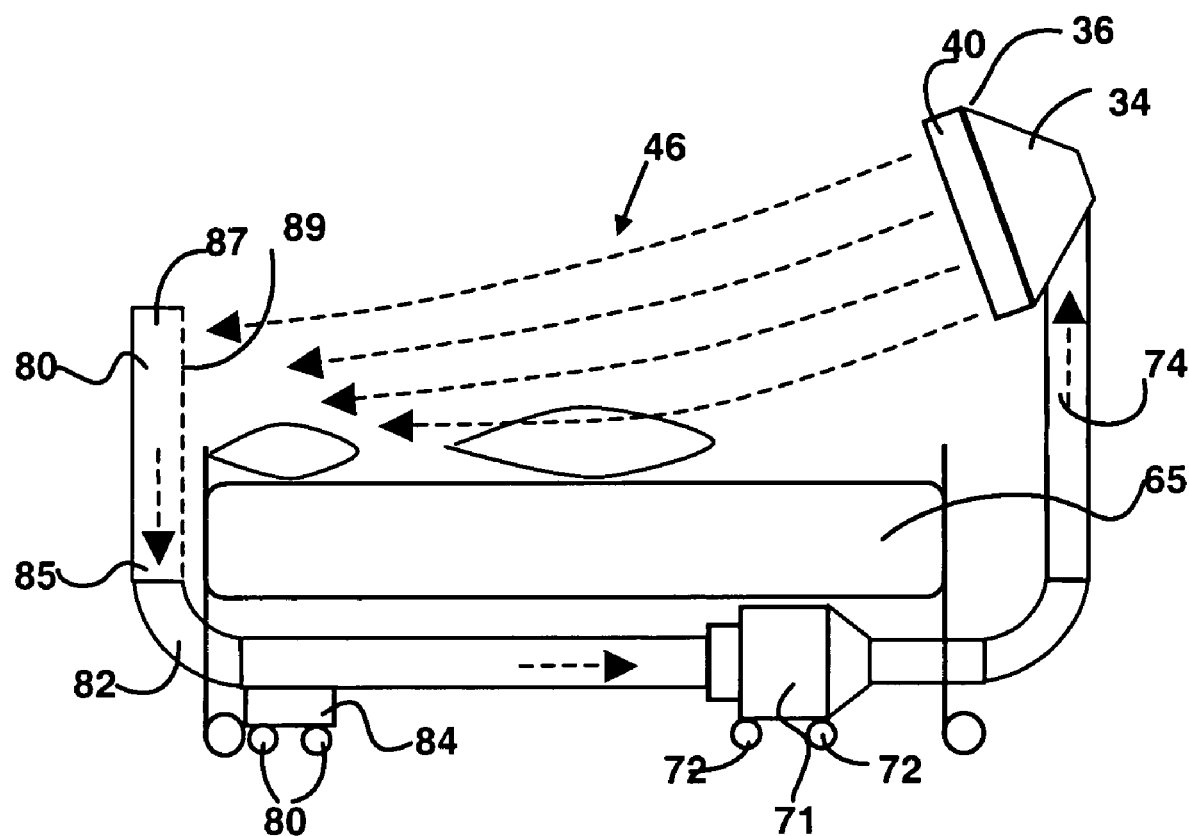
FIG. 3 illustrates a side view of another air filtration system constructed in accordance with the teachings of the present disclosure.
Figure 5:
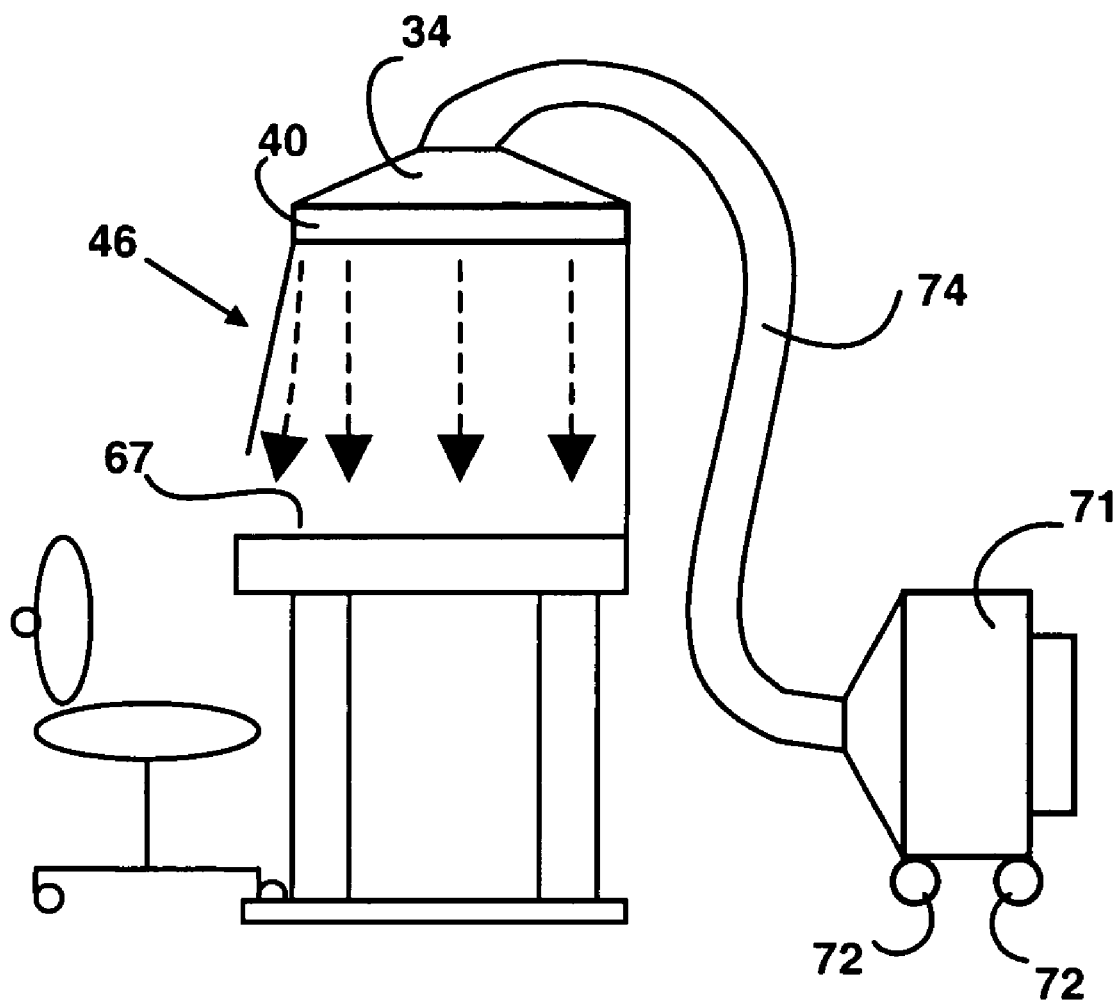
FIG. 5 illustrates a side view of another air filtration system constructed in accordance with the teachings of the present disclosure.
Figure 6:
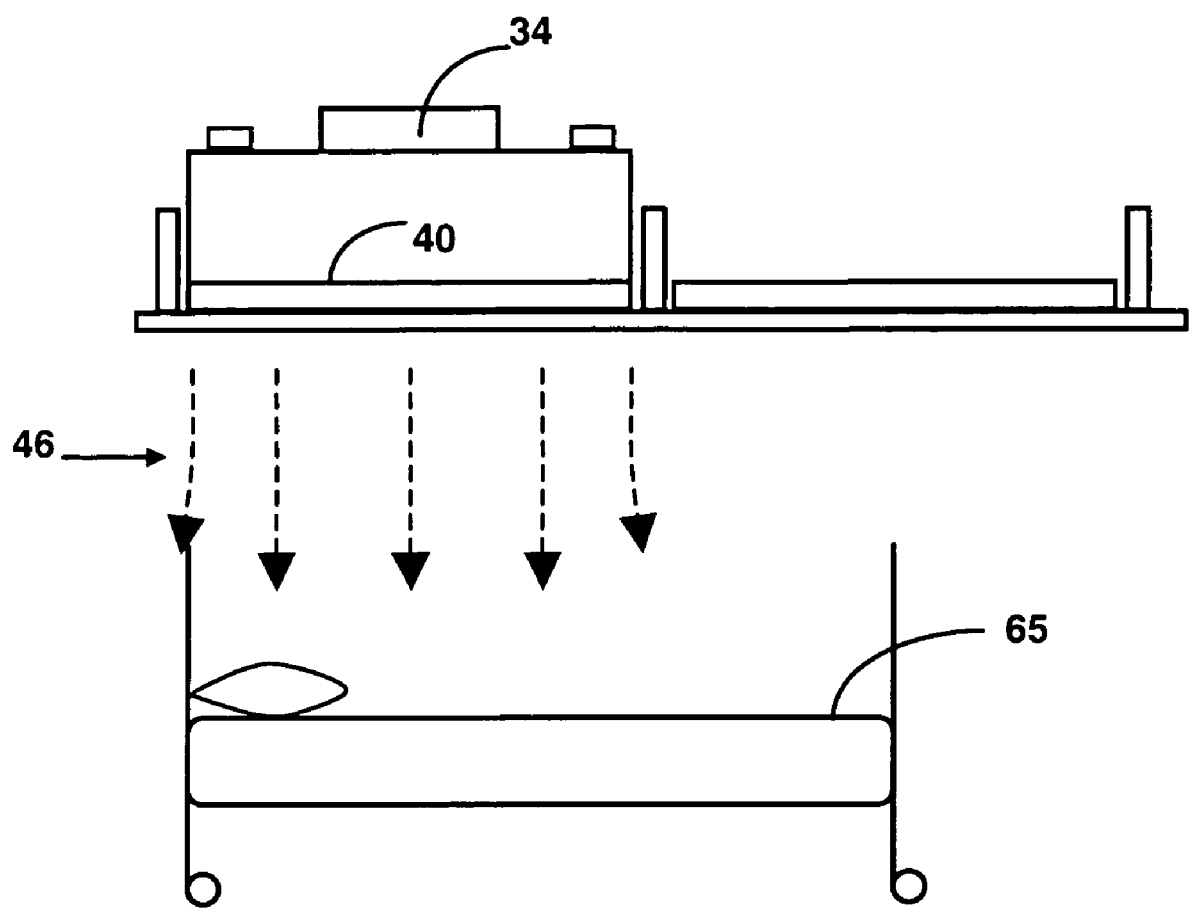
FIG. 6 illustrates a side view of another air filtration system constructed in accordance with the teachings of the present disclosure.

Referring to FIGS. 2, 3 and 5, examples of an air filtration system 30, where the filter and the fan (not shown) is disposed outside the enclosure 34, are shown. The filter and the fan (not shown) can be housed in a housing 71 that is supported on the ground with a plurality of wheels 72. The housing 71 is an air flow communication with the enclosure 34 by an air flow conduit 74. Air flow from filter and the fan (not shown) flows through the air flow conduit 74 to reach the enclosure 34 to then exit from air outlet 36 as the unidirectional or laminar air flow 46. The enclosure 34 may be supported by the air flow conduit 74. Accordingly, the air flow conduit 74 may be rigid to provide such a support. Alternatively, the air flow conduit 74 may be flexible such that the enclosure can be supported by another structure to which it can be attached.

The air filtration system 30 of FIG. 2 is portable and can be moved to any desired location. As described above, the air filtration system 30 of FIG. 2 can be used for numerous applications where clean unidirectional or laminar air is desired over a certain area. Referring to FIG. 5, if the enclosure 34 can be supported in an elevated position, the air flow conduit 74 may be flexible so as to provide more flexibility as to how the air filtration system 30 can be used. For example, a flexible air flow conduit 74 can provide pivoting of the enclosure 34 so that the air flow 46 is directed to any desired location. Also, because the air flow conduit 74 may be flexible, the housing 71 can be moved relative to the enclosure 34. Such flexibility in the position of the housing 71 with respect to the enclosure 34 and the variability of the angle of the air flow 46 may be necessary in certain applications. As shown in FIG. 5, the enclosure 34 can be mounted over the work surface 67 to provide the air flow 46 generally downward onto the work surface 67. Because the air flow conduit 74 is flexible, the housing 71 can be moved with the wheels 72 to any location near the work surface that is allowed by the flexibility and the length of the air flow conduit 74.

The air filtration systems 30 of the present disclosure may also include an air conditioning device (not shown) to provide conditioned air flow from the outlet 36. The air conditioning device, which may be a typical air conditioning unit, a heater, or a humidifier can provide temperature and relative humidity control to the clean air for comfort. The air filtration system 30 may also include a flow conditioning device to provide conditioned air flow from the outlet 36. The flow conditioning device, which may be a perforated plate or a series of straightening vanes, can modify the air flow pattern prior to the diffusion screen to enhance the effectiveness of the diffusion screen.

Referring to FIG. 3, any one of the air filtration systems 30 disclosed herein may include an air return 80 that may be generally located opposite the air outlet 36 so as to capture the air flow 46 and return the air flow 46 to the filter and the fan (not shown). The air return 80 may be connected to the filter and the fan (not shown) with a return air conduit 82. To support the return air conduit 82, an air return support base 84 may be provided. The air return support base 84 can be supported on the ground with a plurality of wheels 86. Accordingly, the entire air filtration system 30, including the air return 80 and the air return conduit 82, can be portable and can be moved to any desired location. The air return 80 can also be pivotable about the hinge 85. Accordingly, the air return 80 can be pointed in a direction so as to capture a large volume of the air flow 46.

The air return 80 can include a pre-filter 87 to clean the captured air prior to conveying the captured air back to the filter and the fan (not shown). Instead of or in addition to the pre-filter 87, the air return 80 can also include a perforated plate 89. Because the air return 80 captures some if not most of the air flow 46, the filter and the fan (not shown) will receive substantially cleaner air than if outside air were drawn into the filter and the fan (not shown) from an air inlet. Although the air return 80 and the air return conduit 82 is shown with respect to the air filtration system of FIG. 3 wherein the filter and the fan (not shown) are in the housing 71 and not disposed in the enclosure 34, one of ordinary skill in the art will appreciate that the air return 80 can be used for air filtration systems 30 such as those shown in FIGS. 1, 4, 7 and 8 where the enclosure 34 also houses the filter and the fan (not shown). If used with the air filtration system of FIGS. 1, 4, 7 and 8, the return air conduit 82 can simply connect the air return 80 to the enclosure 34 so that the air flow 46 can be captured and delivered to the filter and the fan (not shown).

Figure 9:
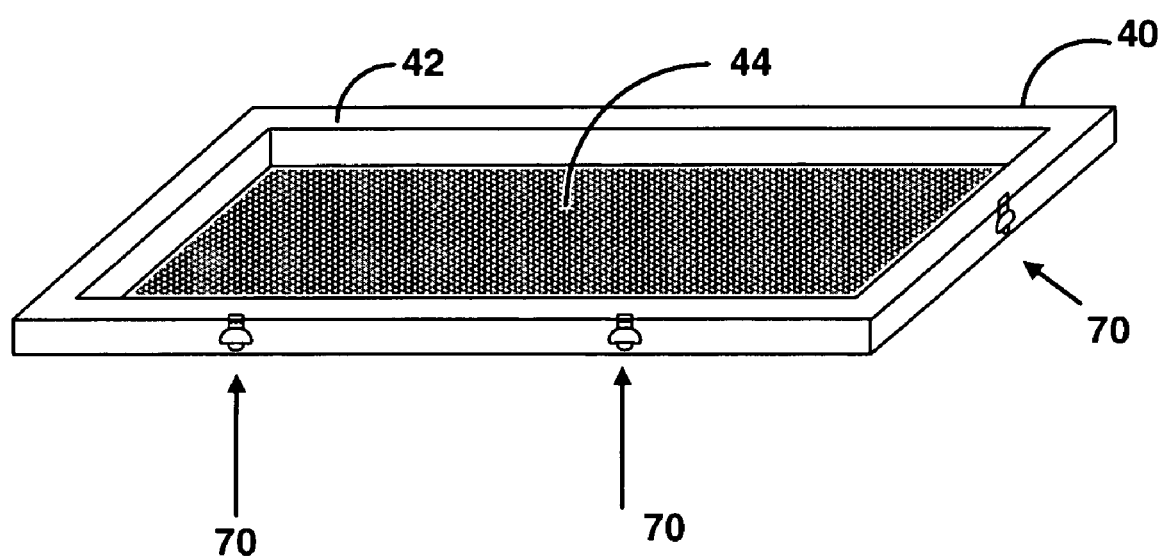
FIG. 9 illustrates a perspective view of a diffusion screen constructed in accordance with the teachings of the present disclosure.
Figure 10A:
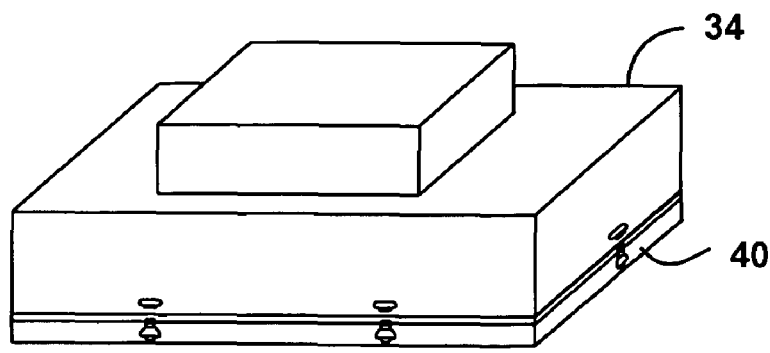
FIGS. 10(A) and 10(B) illustrate a perspective view and a perspective exploded view, respectively, of a diffusion screen and a corresponding fan and filter constructed in accordance with the teachings of the present disclosure.
Figure 10B:
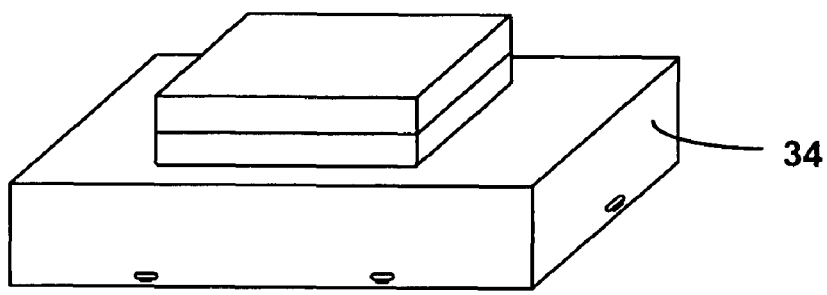
Figure 10B:
Figure 10B:
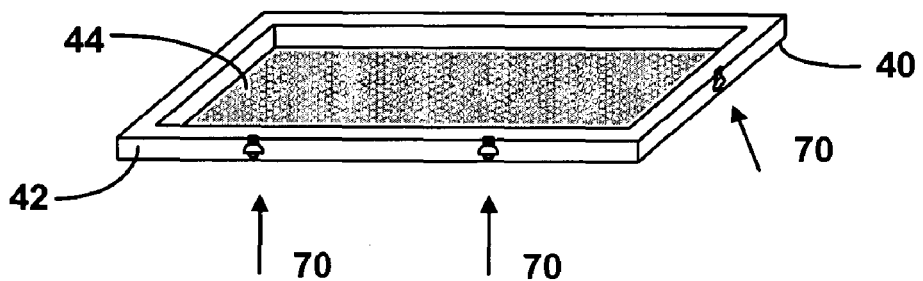

Referring to FIGS. 9, 10(A) and 10(B), the diffusion screen 40 is shown in more detail. The diffusion screen 40 is generally configured to attach to the air outlet 36 and cover the air outlet 36 of any type of air filtration system including the disclosed air filtration system 30. The diffusion screen 40 is attached to the air outlet 36 of the enclosure 34 with one or more releasable fasteners 70. The diffusion screen 40 includes the diffusion layer 44 and can be replaced when desired. Such a replacement may be necessary when the diffusion screen 40 needs to be repaired, cleaned or discarded and replaced with a new diffusion screen 40. Additionally, such a replacement may be necessary when a diffusion layer that provides a different air flow characteristic is desired. As shown in FIGS. 10(A) and 10(B), a gasket 90 can be disposed between the diffusion screen 40 and the air outlet 36 so as to provide a leak-free fit between the diffusion screen 40 and the enclosure 34.

Figure 11A:
FIGS. 11(A)-11(D) illustrate perspective views of exemplary diffusion layer configurations for a diffusion screen constructed in accordance with the teachings of the present disclosure.
Figure 11B:
Figure 11C:
Figure 11D:
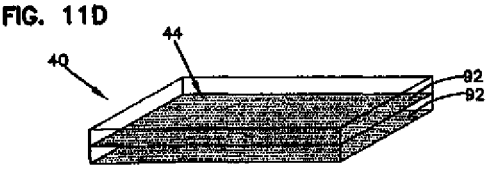

Referring to FIGS. 11(A) and 11(D), several configurations of the diffusion layer 44 are shown. The diffusion layer 44 can include a single layer of a diffusion fabric 92 that includes a weave pattern to provide the unidirectional or laminar air flow 46 out of the air outlet 36. As shown in FIG. 11(A), the diffusion fabric 92 may be disposed at the bottom portion of the diffusion screen 40 so that it is spaced apart from the filter (not shown). In contrast, with reference to FIG. 11(B), the diffusion fabric 92 can be disposed at the upper part of the diffusion screen 40 so as to be adjacent to filter (not shown). Referring to FIGS. 11(C) and 11(D), the diffusion layer 44 may also include several layers of the same or different diffusion fabrics 92 to provide a desired air flow 46 directed outward from the air outlet 36. For instance, the diffusion fabric 92 could provide unidirectional or laminar flow from the air outlet 36. The diffusion fabric may be replaceable so that it can be removed for cleaning or replacement.

Figures 14A, 14B, 14C:
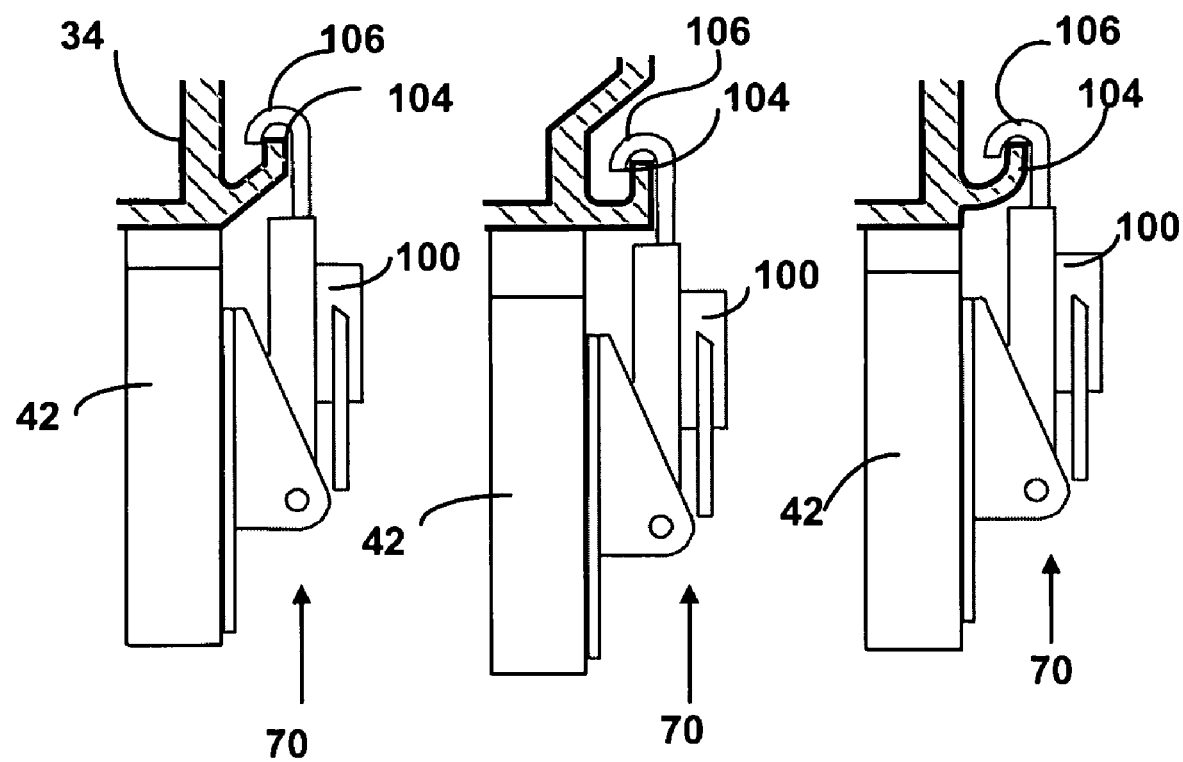
FIGS. 14(A)-14(C) illustrate side views of three exemplary latching mechanisms for removably attaching a diffusion screen to an enclosure and filter in accordance with the teachings of the present disclosure.

The releasable fastener 70 for attaching the diffusion screen 40 to the enclosure 34 may be any type of fastener that can provide releasable attachment. Referring to FIG. 12, an example of a releasable fastener 70 as shown. The releasable fastener 70 can include a latch 100 that is disposed on the frame 42 of the diffusion screen 40. Enclosure 34 may include corresponding latch keepers 102 so that the latches 100 engage the latch keepers 102 and can provide secure fastening of the diffusion screen 40 to the enclosure 34, with the ability to release the diffusion screen 40 from the enclosure 34. Referring to FIGS. 13(A) and 13(B), two examples of latches 100 and latch keepers 102 are shown. Referring to FIGS. 14(A)-14(C), the latches 100 on the diffusion screen 40 may engage a feature of the enclosure 34 such as a lip or a flange 104. Three examples of such a lip or flange 104 are shown in FIGS. 14(A)-14(C). The latch 100 may include a hooked end 106 that can engage with the lip or the flange 104 to secure the diffusion screen 40 to the enclosure 34. The diffusion screen 40 may include only one latch or a plurality of latches 100, and because the enclosure 34 need not necessarily include latch keepers 102, the latches 100 can engage a lip or flange feature of the enclosure 34 to fasten the diffusion screen 40 to the enclosure 34.

The diffusion layer 44 can have either a single layer of the diffusion fabric 92 or multiple layers of the diffusion fabric 92. The multiple layers of diffusion fabric can be two layers of identical fabrics, the same fabric with the same pore sizes, or it can be two layers of the same or different fabrics with different pore sizes. Several characteristics of the diffusion layer 44 can influence the air flow 46. As described above, single or multiple layers of diffusion fabric 92 and their corresponding pore sizes can influence the characteristics of the air flow 46. Additionally, the space between each diffusion fabric 92 and the space between diffusion layer 44 and the filter (not shown) may also influence the characteristics of the air flow 46. The pore sizes of the fabric layers, the weave patterns, and the constituent materials of each diffusion fabric 92 can be selected to provide specific flow characteristics that are desired, such as a unidirectional flow or laminar flow.

In one example of the diffusion screen 40, a one-layer diffusion screen spaced 1-¾ inches apart from filter face performed better than when it was about ⅝ inch apart from filter face. A two-layer diffusion screen with the 1st layer about ⅝ inch apart from filter face and about 1-⅛ inches apart from the 2nd layer under performed a one-layer diffusion screen with layer 1-¾ inch away from filter face. In another example of the diffusion screen 40, a two-layer diffusion screen with two different pore size layers can perform differently if switching the 1st and 2nd layers. When a plain weaved polymeric fabric sheet with a nominal pore size of 150 micrometers is used in a single diffusion layer screen, it demonstrated less lateral flow or better unidirectional flow in flow visualization than a diffusion screen using the same material with 250 micrometer pore size. Depending on the application condition and desired flow, experiments with various combinations of diffusion materials and layers can be conducted to get an optimal or better setup. For instance, for air flow rates of about 90 feet per minute at filter face, a one-layer diffusion screen, made with plain weaved polymeric fabric with pore sizes of around 50 to 200 micrometer range and spaced apart about 1-¾ inches from filter face, may significantly improve the unidirectional flow pattern. Therefore, the clean air can travel much further to the desired area without containment due to minimal cross-contamination than clean air from a filter without diffusion screen. The above-described characteristics of the diffusion screen 40 are only exemplary and are not a limitation to the variety of characteristics that can be employed to provide a desired type of flow.

The disclosed air filtration system 30 can be used in any environment where removal of certain particles, gaseous matter, or contaminate matter from the air is desired. The disclosed air filtration systems 30 can be used in commercial and public facilities such as clean rooms and hospitals. Additionally, the air filtration systems 30 can be used in private homes for persons who suffer from asthma, allergies, and emphysema. The portability, small size, and the ability to remove the diffusion screen 40 for cleaning, repair, or to change flow characteristics makes the use of the disclosed air filtration system 30 possible for residential and private use. However, one of ordinary skill in the art will readily appreciate that the features and functions of the disclosed air filtration system 30 also provide flexibility when used in a commercial or public facility.

Furthermore, while the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. An air filtration system comprising:
 (a) a support structure;
 (b) an enclosure coupled to the support structure and including an air outlet;
 (c) an air filter housed in the enclosure;
 (d) a fan operatively coupled to the enclosure;
 (e) a screen frame; and
 (f) a unidirectional flow screen spanning the screen frame, the unidirectional flow screen having a downstream side defined along a single plane, the unidirectional flow screen covering the air outlet to result in unidirectional filtered air flow; the unidirectional flow screen:
  (i) being spaced from the air filter;
  (ii) consisting of a single layer of polymeric fabric constructed and arranged to provide unidirectional filtered air flow from the air outlet such that filtered air flows in a single direction with generally parallel air streamlines;
  (iii) having a weave pattern with pore sizes of 50-200 micrometers; and
  (iv) creating only unidirectional parallel air streamlines across the flow screen, to shield a work area from unfiltered air surrounding the work area to result in filtered air that travels further to the work area with lower levels of cross-contamination from particulates present in the surrounding unfiltered air than filtered air from an air filtration system without a unidirectional flow screen.

2. An air filtration system according to claim 1 wherein: the unidirectional flow screen is spaced 1¾ inches from the air filter.

3. An air filtration system according to claim 1 wherein: the weave pattern is a plain weave pattern.

4. An air filtration system according to claim 1 wherein: the weave pattern has nominal pore sizes of 150 micrometers.

\* \* \* \* \*

UNITED STATES PATENT AND TRADEMARK OFFICE
CERTIFICATE OF CORRECTION

| | |
|---|---|
| PATENT NO. | : 7,753,977 B2 |
| APPLICATION NO. | : 11/149019 |
| DATED | : July 13, 2010 |
| INVENTOR(S) | : Lyons et al. |

It is certified that error appears in the above-identified patent and that said Letters Patent is hereby corrected as shown below:

Drawings, Sheet 11 of 13: Please delete incorrect Sheet 11 of 13 and replace with correct Sheet 11 of 13:

Signed and Sealed this
Fifteenth Day of March, 2011

David J. Kappos
*Director of the United States Patent and Trademark Office*